(12) United States Patent  
Pienta et al.

(10) Patent No.: US 8,707,532 B2  
(45) Date of Patent: Apr. 29, 2014

(54) METHOD FOR REMOVING WIRES FROM A BALE

(75) Inventors: Daniel J. Pienta, Lambertville, MI (US); David M. Pienta, Lambertville, MI (US)

(73) Assignee: Automatic Handling Intl., Erie, MI (US)

( * ) Notice: Subject to any disclaimer, the term of this patent is extended or adjusted under 35 U.S.C. 154(b) by 184 days.

(21) Appl. No.: 13/314,696

(22) Filed: Feb. 7, 2012

(65) Prior Publication Data

US 2012/0152070 A1 Jun. 21, 2012

Related U.S. Application Data

(62) Division of application No. 12/380,131, filed on Feb. 24, 2009, now Pat. No. 8,160,748.

(60) Provisional application No. 61/067,203, filed on Feb. 26, 2008.

(51) Int. Cl.  
*B23P 19/02* (2006.01)

(52) U.S. Cl.  
USPC ............................................................ 29/426.4

(58) Field of Classification Search  
USPC ............... 29/426.4, 564.3, 426.1, 709, 712; 700/259; 901/47, 41; 83/909  
See application file for complete search history.

(56) References Cited

U.S. PATENT DOCUMENTS 5,052,098 A * 10/1991 Thumm ..................... 29/564.3

* cited by examiner

*Primary Examiner* — John C Hong  
(74) *Attorney, Agent, or Firm* — Emch, Schaffer, Schaub & Porcello Co. LPA

(57) ABSTRACT

A method and apparatus for removing wires from a bale includes a conveyor system for moving one or more bales and a de-wiring station positioned adjacent the conveyor system. The de-wiring station includes a robot with an end tool. A bale that is bound by one or more wires is transferred by the conveyor system to a position proximate the de-wiring station. The robot with end tool moves to sense the location of the wires, cut the wires, collect the wires and deposit the wires in a collection hopper.

7 Claims, 5 Drawing Sheets

मETHOD FOR REMOVING WIRES FROM A BALE

CROSS REFERENCE TO RELATED APPLICATION

This application is a divisional of U.S. application Ser. No. 12/380,131, filed Feb. 24, 2009, now U.S. Pat. No. 8,160,748 which is a conversion of U.S. provisional patent application Ser. No. 61/067,203, filed Feb. 26, 2008.

TECHNICAL FIELD

The invention relates generally to a method and apparatus for removing wires from a bale of material.

BACKGROUND OF THE INVENTION

Raw material, intended for manufacture, is often transported and presented for manufacture in bales. A prime example is the presentation of pulp paper material, in a bale bound by wire, intended for use in the manufacture of various paper products. When the bale bound by wire reaches the manufacturing setting the wire is usually manually clipped and removed from the bale. Such a manual process presents inefficiencies and a potential for injury to workers. The worker must use a sharp cutting tool and remove the cut wires from the bales, depositing those wires in a storage bin. Many times the metal wires are under tension and if the worker is not careful, the wires may snap away from the bale upon being cut.

Therefore, there is a need for an automated system for removing the metal wires from a bale, thus, eliminating any potential for injury to a worker.

There is further a need for an automatic system for removing wires from a bale in a timely and efficient manner.

SUMMARY OF THE INVENTION

The invention is a method and apparatus for removing wires from a bale. The invention includes, among other things, a robot having a full range of movement on three planes. The robot carries an end tool which comprises a vision system used to locate the wire and a cutting tool for cutting the wire. The end tool further includes a wire collecting spindle which removes the cut wires from the bale. The robot transports the wires to a hopper and the wire collecting spindle deposits the wires in the hopper.

The apparatus includes a conveyor system for moving one or more bales and a de-wiring station positioned adjacent the conveyor system. The de-wiring station includes the robot with end tool. A bale that is bound by one or more wires is transferred by the conveyor system to a position proximate the de-wiring station. The robot with end tool then moves to sense the location of the wires, cut the wires, collect the wires and deposit the cut wires in a collection hopper. The de-wired bale is then moved by the conveyor system to manufacturing and another wire bound bale is moved proximate to the de-wiring station.

DETAILED DESCRIPTION OF THE PREFERRED EMBODIMENT

Figure 2:
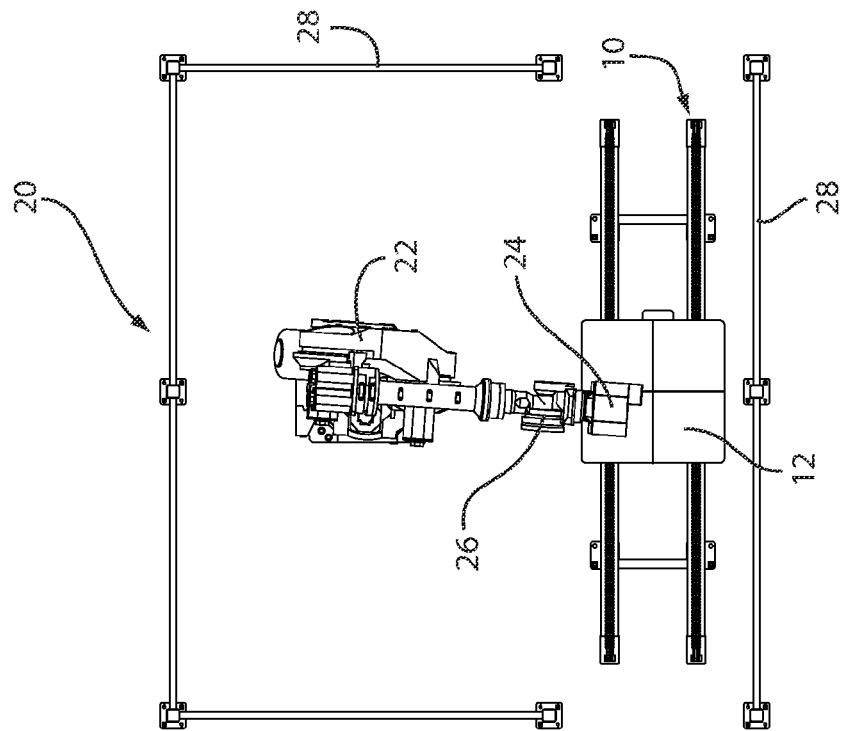
FIG. 2 is a top view of the de-wiring station, also showing the protective fencing around the de-wiring station.
Figure 1:
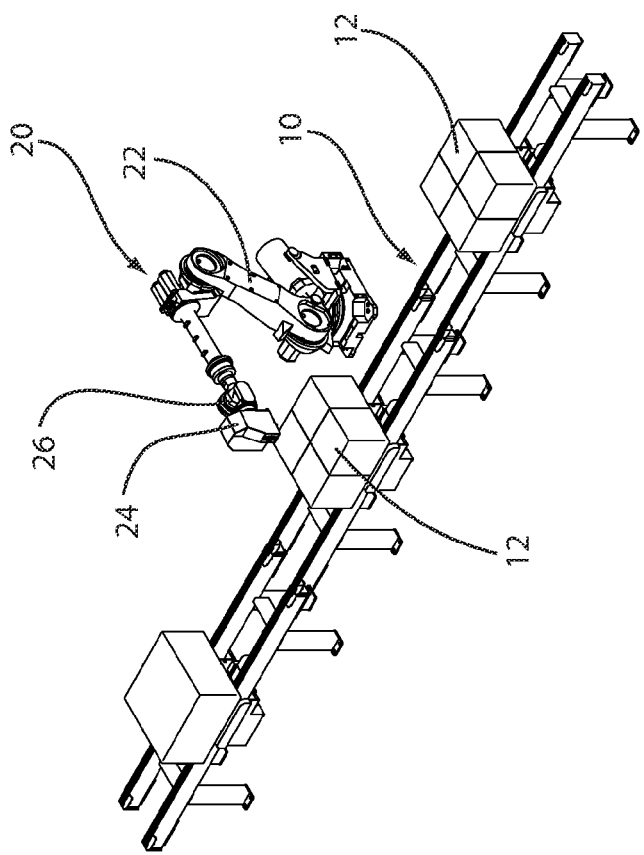
FIG. 1 is a perspective view of the apparatus of the invention showing the conveyor system and de-wiring station with robot and end tool.

Referring to FIGS. 1 and 2, the overall apparatus for de-wiring a bale is shown in detail. The system includes a conveyor mechanism 10 designed to carry bales of paper pulp 12 or other bound materials past a de-wiring station 20 comprising an industrial robot 22 designed to have a full range of motion in three planes. An end tool 24 is carried by the industrial robot 22 on its distal wrist 26. In the operational environment, the de-wiring station 20 will have a fence 28, as shown in FIG. 2, around the motion area of the robot 22 as a safety precaution in the work place.

Figure 3:
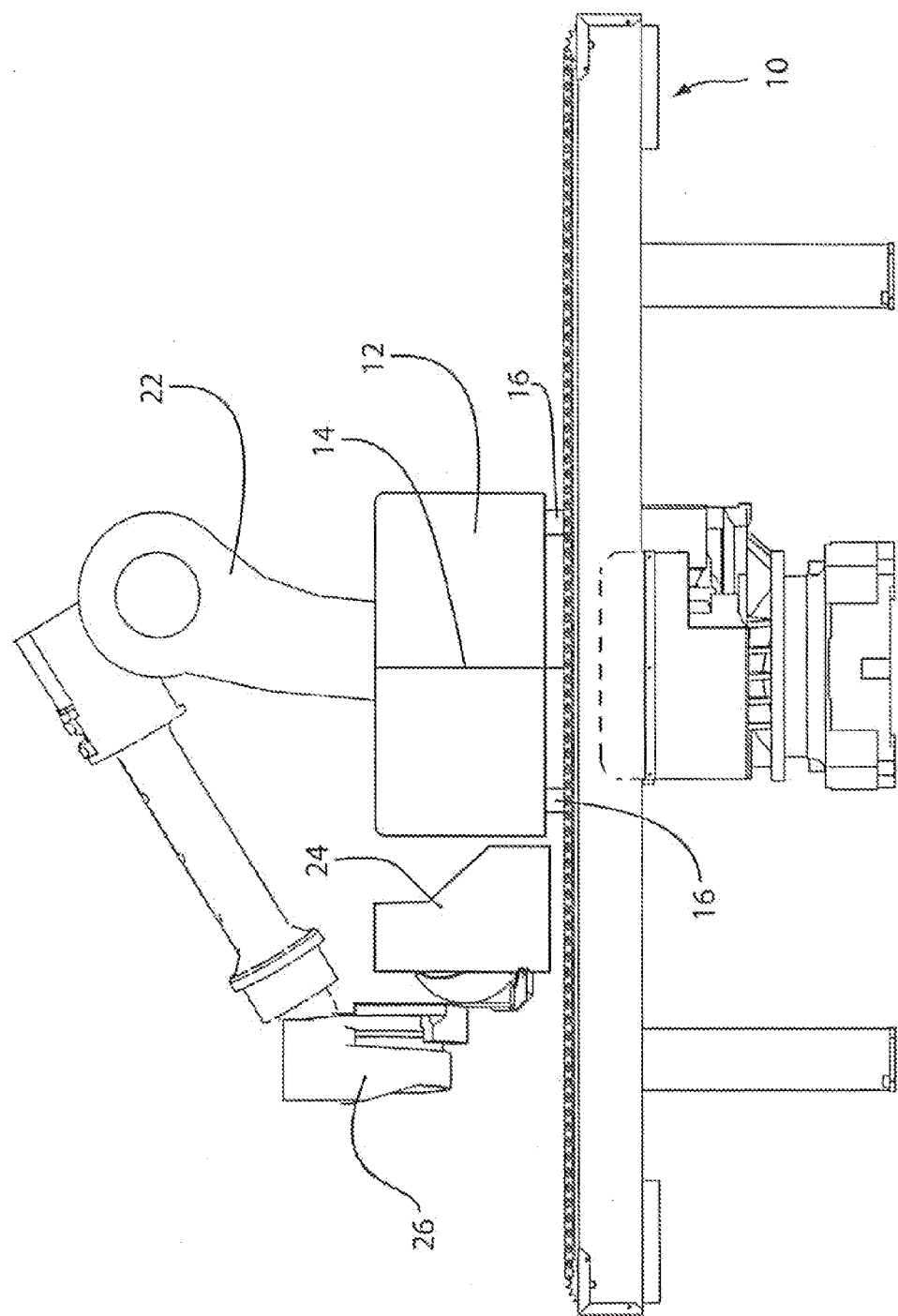
FIG. 3 is a front elevation view of the apparatus of the invention with the end tool in position to cut a wire.

Referring now to FIG. 3, when the wired bale 12 is in position proximate the de-wiring station 20, the bale 12 is lifted off of the conveyor 10 by pop-up cylinders 16 or an inflatable air bag or a similar elevation device. Elevating the bale 12 removes the wires 14 from contact with the conveyor 10. The robot 22 will locate the wires 14 on the lower sides of the bale 12 and perform the clipping operation of the wires at that location. The bottom portion of the clipped wire 14 will fall downward through the conveyor 10 to a hopper (not shown). The upper portion of the clipped wires 14 will be gathered by the wire spindle, to be described in detail later, and the robot 22 will move to deposit the gathered clipped wires into a hopper (not shown) elsewhere in the de-wiring station.

Figure 5:
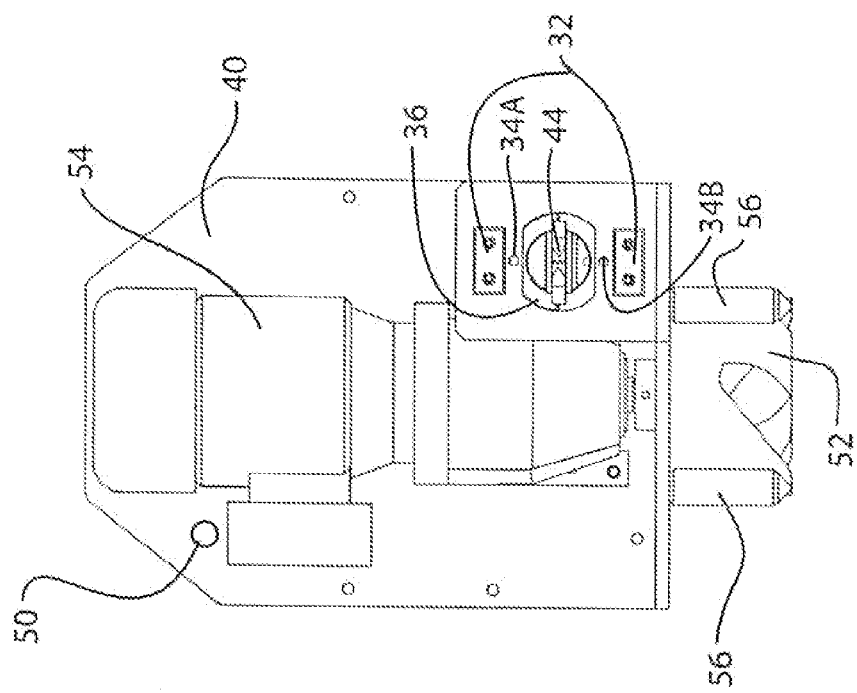
FIG. 5 is a front elevation view of the end tool.
Figure 4:
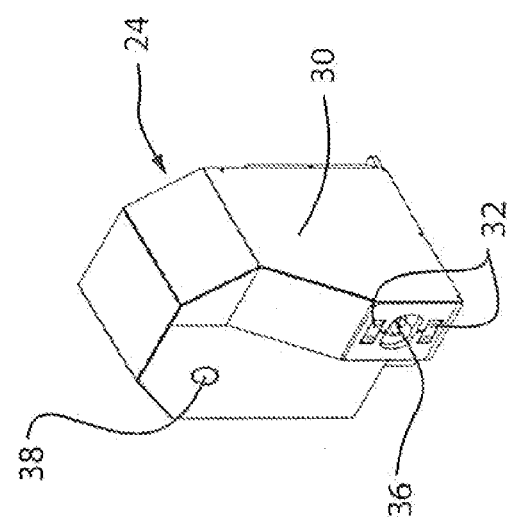
FIG. 4 is a perspective view of the end tool.
Figure 6:
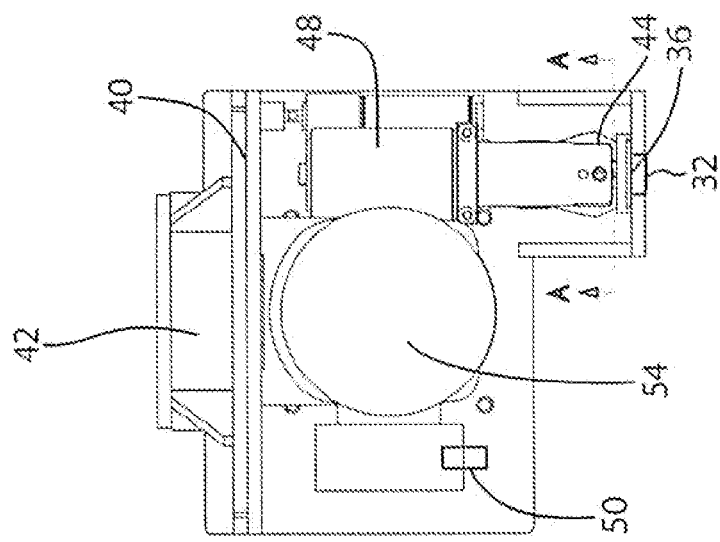
FIG. 6 is a top view of the end tool.

Referring to FIGS. 4-6 the end tool 24 is shown in detail. The end tool 24 includes a housing 30 as shown in FIG. 4. Located in the housing 30 is camera opening 38. The front of the end tool carries bumper pads 32 and upper and lower sensors 34A, 34B. Located in between the sensors 34A-B, is clipper opening 36.

Figure 7:
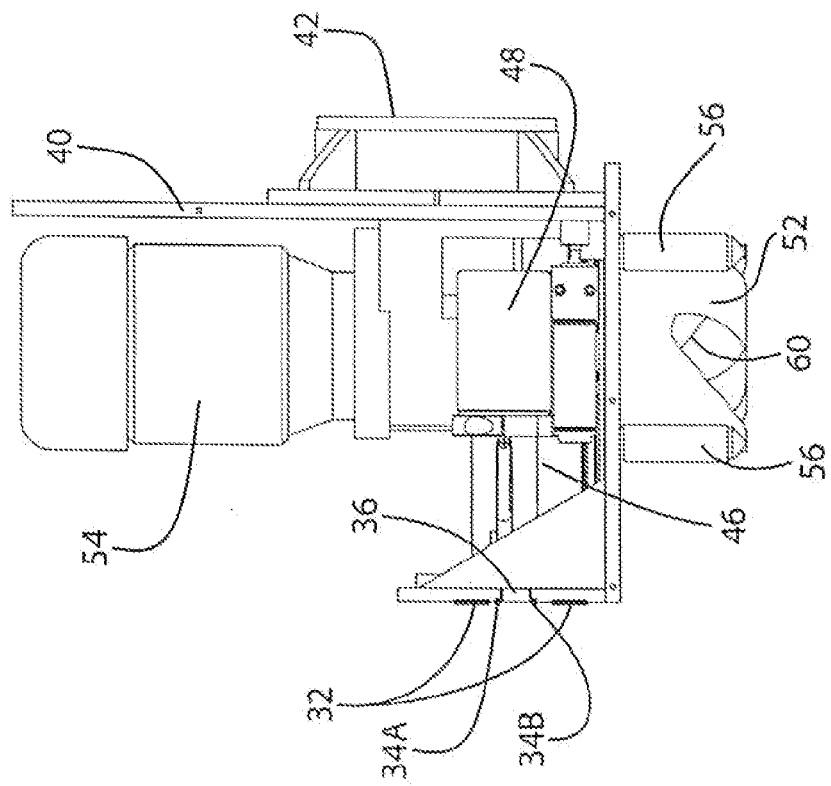
FIG. 7 is a side elevation view of the end tool.

Referring now to FIGS. 5-7, the end tool is shown in detail with the housing 30 removed. The end tool has a frame 40 which supports the various components of the end tool. The frame 40 is attached to the wrist 26 of the robot 22 by carriage 42. A cutting tool 44 is located in the clipper opening 36 and, at rest, is retracted within the clipper opening 36. The cutting tool 44 is engaged with a linear rail carriage 46. The linear rail carriage is attached to cylinder 48. As the cylinder 48 is activated the linear rail carriage 46 moves the cutting tool 44 into cutting position wherein it is extended outward through the clipper opening 36. After the cutting of the wires is accomplished, the cylinder 48 retracts the linear rail carriage 46 and pulls the cutting tool 44 back into the opening 36. With the cutting tool 44 retracted, there is no possibility of inadvertent snagging or cutting of material or operator. The end tool 24 also carries a camera 50 which operationally visions the bale and assists in positioning the end tool.

Figure 8:
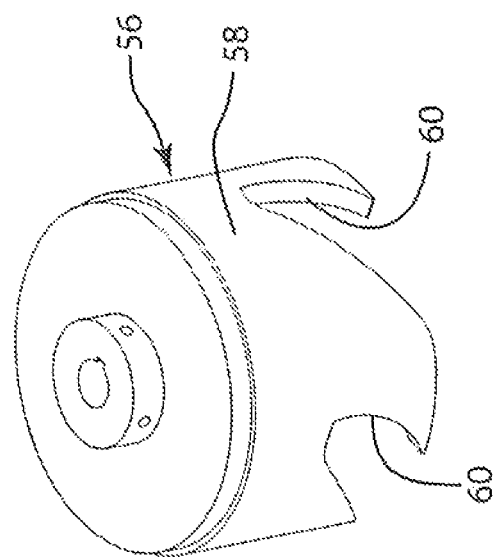
FIG. 8 is a perspective view of the wire collecting spindle.

The end tool further carries wire collecting spindle 52 which is driven by motor 54. Four wire guide pins 56 are located in close proximate position to the spindle 52 and extend to the lower most point of the spindle 52. Referring to FIG. 8, the spindle is composed of a circular pipe-like casing 58 having four slots 60 positioned at 90° orientation cut into the casing 58.

In operation, a bale bound by wires is positioned in front of the de-wiring station as shown in FIG. 2. As shown in FIG. 3 the robot uses its visioning system through its camera to locate the wires on the sides of the bale. Once the end tool is positioned along the wire on the sides of the bale the sensors locate the wire and the robot extends the end tool into engagement with the bale. The wire is pinned against the bale by the bumper pads. The cylinder activates the linear rail carriage extending the cutting tool into engagement with the wire. The cutting tool then cuts the wire and the cylinder retracts the cutting tool back into the clipper. The engagement of the bumper pads with the wire and the bale prevents the wire from springing and releasing away from the bale.

Once both wires are cut, the visioning system orients the end tool to the top of the bale and the robot lowers the end tool to the bale until the guide pins engage the top surface of the bale. The motor is then activated and the spindle turns gathering the clipped wires into the slots rotating the wires up into the internal cavity of the spindle. Once the wires are removed the robot locates the wire hopper and the motor is reversed thus disgorging the clipped wires from the spindle.

While the invention has been described with reference to particular embodiments, it should be understood that various changes may be made and equivalence substituted for elements thereof without departing from the essential scope of the invention. In addition, many modifications may be made to adapt to a particular situation or material to the teachings of the invention without departing from the essential scope. Therefore, it is intended that the invention not be limited to the particular embodiments described but that the invention shall include all embodiments falling within the scope of the claims.

We claim:

1. A method for clipping wires from a bale having a lower side, an upper side and wires extending around the bale in contact with said lower side and said upper side, comprising the steps of:
    (a) positioning a cutter tool into engagement with said bale in said lower side, said cutter tool having a full range of motion in 3 planes;
    (b) locating said wires with a visioning system;
    (c) cutting said wires in said lower side with said cutting tool;
    (d) re-positioning said cutting tool to said upper side;
    (e) locating and cutting said wires with said visioning system;
    (f) removing said wires from said bale; and
    (g) continuing to reposition said cutting tool and locating said wires until all wires have been clipped from said bale.

2. The method according to claim 1 further including the steps of lifting said bale prior to said cutting step.

3. The method according to claim 1 further including the steps of:
    (h) positioning said cutting tool in an end tool, having a housing, said housing having an opening;
    (i) extending said cutting tool out of said opening and into engagement with said wire; and
    (j) cutting said wire.

4. The method according to claim 3 further including the step of:
    (k) retracting said cutting tool back into said housing following step (j).

5. The method according to claim 3 further including the steps of:
    (l) positioning a rotatable spindle on said end tool; and
    (m) rotating said spindle during step (f) to gather said wire into said spindle.

6. The method according to claim 5 further including the steps of:
    (n) rotating said spindle in a first direction to gather said wire into said spindle and
    (o) rotating said spindle in a reverse direction to disgorge said wire from said spindle.

7. The method according to claim 5 further including the steps of:
    (n) providing an internal cavity on said spindle;
    (o) rotating said spindle in a first direction to gather said wire into said internal cavity; and
    (p) rotating said spindle in a reverse direction to disgorge said wire from said internal cavity.

* * * * *